US008970668B2

(12) United States Patent
Lin et al.

(10) Patent No.: US 8,970,668 B2
(45) Date of Patent: Mar. 3, 2015

(54) HIGH BANDWIDTH STREAMING TO MEDIA PLAYER

(75) Inventors: Te Sheng Lin, Cresskill, NJ (US); M. James Ho, Centreville, VA (US); Michael P. Ruffini, Methuen, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 463 days.

(21) Appl. No.: 12/955,096

(22) Filed: Nov. 29, 2010

(65) Prior Publication Data

US 2012/0133731 A1 May 31, 2012

(51) Int. Cl.
- *H04N 13/00* (2006.01)
- *H04N 21/262* (2011.01)
- *H04N 21/472* (2011.01)
- *H04L 29/06* (2006.01)

(52) U.S. Cl.
CPC ....... *H04N 13/0059* (2013.01); *H04N 13/0051* (2013.01); *H04N 21/26216* (2013.01); *H04N 21/47202* (2013.01); *H04L 65/4084* (2013.01)
USPC .......................................................... 348/42

(58) Field of Classification Search
CPC ........... H04L 65/4084; H04N 13/0051; H04N 13/0059; H04N 21/26216; H04N 21/47202
USPC .......................................................... 348/42
See application file for complete search history.

(56) References Cited

U.S. PATENT DOCUMENTS

| | | | |
|---|---|---|---|
| 6,640,097 B2* | 10/2003 | Corrigan et al. | 455/414.1 |
| 2002/0046273 A1* | 4/2002 | Lahr et al. | 709/224 |
| 2002/0059619 A1* | 5/2002 | Lebar | 725/87 |
| 2005/0005306 A1* | 1/2005 | Kim et al. | 725/131 |
| 2005/0015812 A1* | 1/2005 | Banet et al. | 725/126 |
| 2005/0033850 A1* | 2/2005 | Kirkland | 709/228 |
| 2005/0071663 A1* | 3/2005 | Medvinsky et al. | 713/200 |
| 2005/0086501 A1* | 4/2005 | Woo et al. | 713/189 |
| 2005/0091164 A1* | 4/2005 | Varble | 705/52 |
| 2005/0192820 A1* | 9/2005 | Simon et al. | 705/1 |
| 2005/0278259 A1* | 12/2005 | Gunaseelan et al. | 705/59 |
| 2007/0006327 A1* | 1/2007 | Lal et al. | 726/31 |
| 2007/0094691 A1* | 4/2007 | Gazdzinski | 725/62 |
| 2007/0226150 A1* | 9/2007 | Pietrzak et al. | 705/59 |
| 2009/0021585 A1* | 1/2009 | Ko et al. | 348/184 |
| 2009/0193474 A1* | 7/2009 | Stein | 725/82 |
| 2009/0217326 A1* | 8/2009 | Hasek | 725/87 |
| 2010/0017814 A1* | 1/2010 | Archer | 725/14 |
| 2010/0017892 A1* | 1/2010 | Iwamura et al. | 726/31 |
| 2010/0275226 A1* | 10/2010 | Kitazato | 725/32 |
| 2011/0015968 A1* | 1/2011 | Carlson | 705/10 |
| 2011/0107379 A1* | 5/2011 | Lajoie et al. | 725/87 |
| 2012/0060095 A1* | 3/2012 | Klappert | 715/722 |

\* cited by examiner

*Primary Examiner* — Sath V Perungavoor
*Assistant Examiner* — Peter D Le

(57) ABSTRACT

A method performed by one or more computing devices includes receiving, by a data center and from a user device via a public network connection, a selection of high-definition three-dimensional (HD3D) content and sending, by the data center and to the user device, a link to a content delivery system to provide the selected HD3D content. The method also includes receiving, by the content delivery system and from the user device, a streaming request for the selected HD3D content; reserving, by the content delivery system, bandwidth, for the selected HD3D content, within a managed network; and sending, by the content delivery system and to the user device, a streaming Internet protocol (IP) address for providing the selected HD3D content over the managed network.

18 Claims, 6 Drawing Sheets

HIGH BANDWIDTH STREAMING TO MEDIA PLAYER

BACKGROUND

Three-dimensional (or stereoscopic) television (3DTV) is a recent development for digital video and presents a growth opportunity for service providers. Some predict that consumers will one day demand 3DTV as an expected option for a premium TV viewing experience. Stereoscopic video generally creates a three-dimensional illusion by using a pair of synchronized two-dimensional videos (e.g., a separate set of images for a left eye and a right eye) that a user can view with special lenses. Thus, for a broadband or broadcast environment, 3DTV programming may require double the bandwidth of similar quality two-dimensional programming.

Bandwidth requirements to support full high-definition (HD) resolution for 3DTV defined by, for example, the Blu-ray Disc Association include video with up to 1920×1080 progressive scan at 24 frames per second for each eye, or 1280×720 progressive scan at up to 59.94 frames per second for each eye. Eventually, even higher video quality will be expected, which will consume even greater bandwidth. For example, video qualities of 1920×1080 progressive scan at 60 frames per second×2 images (employing capped variable bit-rate (VBR) and Multiview Video Coding (MVC)) can be in the order of 25-35 Mbps for a single streaming session. These high bandwidth requirements present a challenge for service providers to support delivery of full HD resolution 3DTV to consumers in, for example, a video-on-demand (VOD) environment.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a mechanism for providing full HD resolution stereoscopic video (referred to herein as "HD3D content") to a subscriber over a network. The system and/or methods described herein may provide a user with a framework to request HD3D content in an integrated context with other content, such as conventional video-on-demand (VOD) and HD VOD content. Use of the systems and/or methods described herein may achieve full-resolution HD3D content streaming via a managed content delivery network with quality of service (QoS) control while a user's content selection, purchase, and browsing activities are conducted via a broadband/or Internet connection.

In an example implementation, systems and/or methods described herein may receive, from a user device via a public network connection, a selection of HD3D content and may send, to the user device, a link to a content delivery system that will provide the selected HD3D content. The system and/or methods also may receive, from the user device, a streaming request for the selected HD3D content and may reserve bandwidth, for the selected HD3D content, within a managed network. The systems and/or methods may send, to the user device, a streaming Internet protocol (IP) address for providing the selected HD3D content over the managed network and may receive, from the user device and via the streaming IP address, a request for the selected HD3D content. The systems and/or methods may then stream, to the user device, the selected HD3D content.

As used herein, the terms "user," "consumer," "subscriber," and/or "customer" may be used interchangeably. Also, the terms "user," "consumer," "subscriber," and/or "customer" intended to be broadly interpreted to include a user device or a user of a user device.

Figure 1:
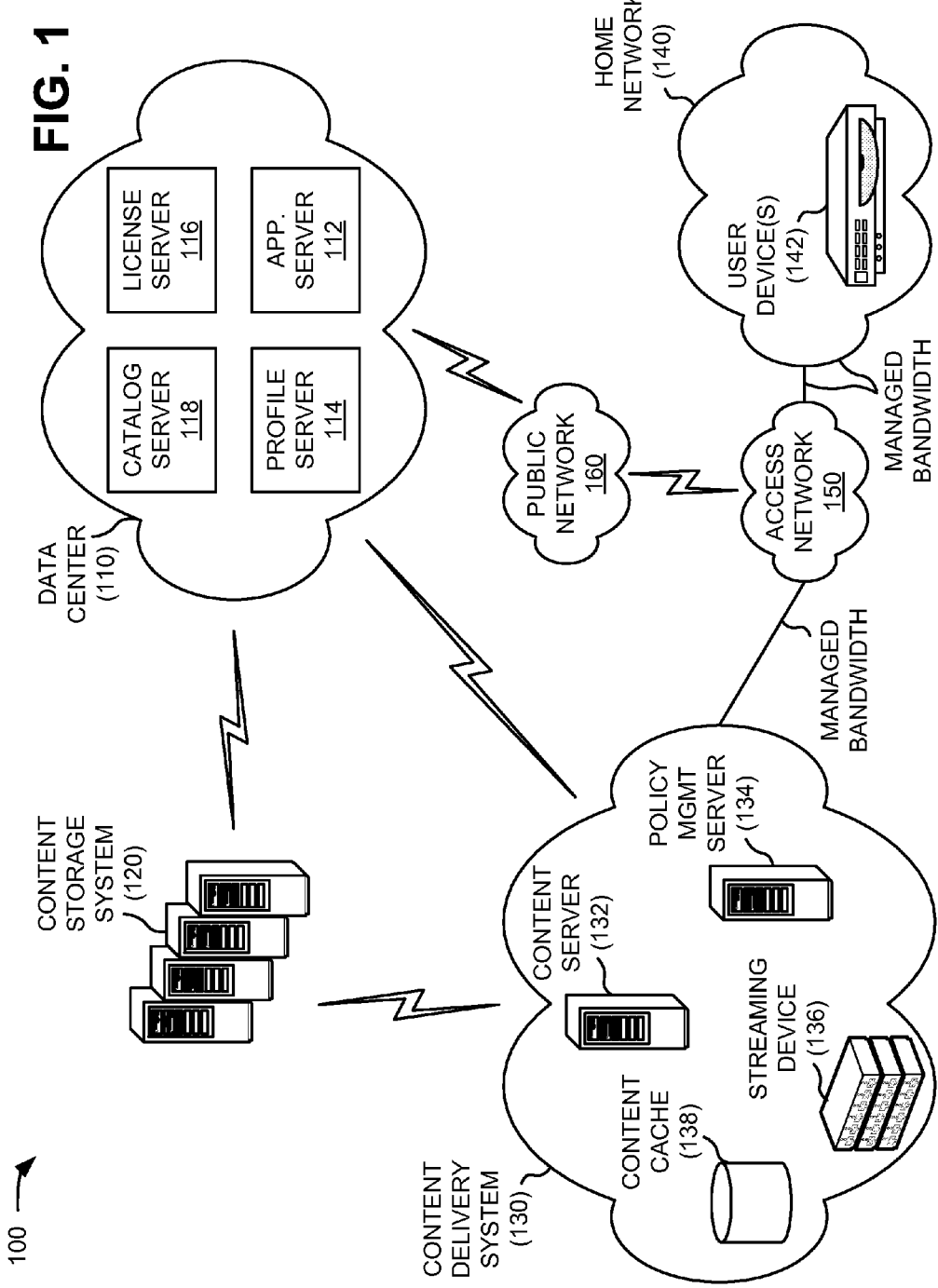
FIG. 1 is a diagram that illustrates an example environment in which systems and/or methods, described herein, may be implemented.

FIG. 1 is a diagram that illustrates an example environment 100 in which systems and/or methods described herein may be implemented. As shown in FIG. 1, environment 100 may include a data center 110, a content storage system 120, a content delivery system 130, a home network 140, an access network 150, and a public network 160. Devices and/or networks of FIG. 1 may be connected via wired and/or wireless connections.

Data center 110 may include one or more devices that may manage the authorization, selection, and/or purchase of multimedia content by a user of a user device 142. As shown in FIG. 1, data center 110 may include, for example, an application server 112, a profile server 114, a license server 116, and/or a catalog server 118. In one implementation, data center 110 may be accessed by user devices 142 via public network 160.

Application server 112 may include a server device, such as a computer device, that provides (e.g., to user device 142) a video catalog application and/or performs user authentication, content listing management, or order processing. For example, application server 112 may permit user device 142 to download a video catalog application that may permit a user to find video content of interest or play downloaded or streaming video content. The video catalog application may enable user device 142 to present to a user of user device 142 information received from data center 110 in an interactive format to allow selection of particular HD3D content. Additionally, or alternatively, application server 112 may provide video content metadata, such as lists or categories of video content. Also, or alternatively, application server 112 may authenticate a user who desires to purchase, rent, or subscribe to video content. In one implementation, the interactions between application server 112 and user device 142 may be performed using the hypertext transfer protocol (HTTP) or the secure HTTP (HTTPS). In another implementation, the interactions between application server 112 and user device 142 may be performed using another type of protocol.

Profile server 114 may include a server device, such as a computer device, that stores user profile information for users (e.g., users of user devices 142). The user profile information may include various information regarding a user, such as login information (e.g., a user identifier and a password), billing information, address information, types of services to which the user has subscribed, a list of video content purchased by the user, a list of video content rented by the user, a list of video content to which the user has subscribed, ratings of video content by the user, a user device identifier (e.g., a media player identifier, a mobile device identifier, a set top box identifier, a personal computer identifier) for user device 142, a video content application identifier associated with the video content application obtained from application server 112, or the like. Application server 112 may use the user profile information to authenticate a user and may update the user profile information based on the user's activity (e.g., with the user's express permission).

License server 116 may include a server device, such as a computer device, that provides key and license management. License server 116 may communicate with user device 142 directly or communicate with user device 142 via application server 112. For example, license server 116 may receive a request from user device 142 for a license relating to video content that user device 142 has downloaded. The license may include information regarding the type of use permitted by user device 142 (e.g., a purchase, a rental, or a subscription) and a decryption key that permits user device 142 to decrypt the video content. In one implementation, the communications between license server 116 and user device 142 may be conducted over a secure channel, may include public and private keys, or may include other forms of secure communication.

In implementations herein, license server 116 may communicate with user device 142 to authenticate a user of user device 142, user device 142, and/or an application residing on user device 142. For example, license server 116 may request/receive login information associated with the user, and compare the login information with stored information to authenticate the user. Additionally, or alternatively, license server 116 may request/receive device information (e.g., a unique device identifier) associated with user device 142, and compare the device information with stored information to authenticate the user device. Also, or alternatively, license server 116 may request/receive application information associated with a client application (e.g., a client application residing on user device 142 to enable selection of HD3D content), and compare the application information with stored information to authenticate the application.

Catalog server 118 may include a server device, such as a computer device, that collects and/or presents listings of content available to user devices 142. For example, catalog server 118 may receive video content metadata, such as lists or categories of video content, from content storage system 120 and/or content delivery system 130. Catalog server 118 may use the video content metadata to provide currently-available content options to user devices 142. Catalog server 118 may provide the video content metadata to user device 142 directly or may communicate with user device 142 via application server 112.

Content storage system 120 may include one or more server devices, such as a computer device, or a storage device, such as a database, that stores and processes video content. Video content may include, for example, personal video content, public video content, and/or other multimedia content. Content storage system 120 may perform encoding operations on video content using, for example, public/private keys. Content storage system 120 may also perform transcoding operations on the video content. Content storage system 120 may store video content in encrypted and/or encoded form. Video content may include, for example, encoded video content in any of a variety of formats, including, for example, MVC, VC-1, MPEG-2 TS, MPEG-4 AVC/H.264. In one implementation, video content in content storage system may include HD3D content (e.g., stereoscopic video) with 1080p resolution scanning at 60 frames per second.

Content delivery system 130 may include one or more devices that may provide video content, instructions, and/or other information to user devices 142. Content delivery system 130 may temporarily store and provide content that is the subject of a content request from user device 142. In one implementation, access to content delivery system 130 (e.g., by user devices 142) may be restricted by a service provider that operates content delivery system 130. For example, access to content delivery system 130 may be restricted to particular users with particular subscription packages and enforced by, for example, password protection (for a user), device identifiers (for user device 142 and or home network 140), and/or application identifiers (e.g., residing on user device 142 and/or portable media). As shown in FIG. 1, content delivery system 130 may include a content server 132, a policy management server 134, a streaming device 136, and a content cache 138.

Content server 132 may include a server device, such as a computer device, that manages delivery of video content to user devices 142. For example, content server 132 may permit a user device 142 to download particular video content once the user, of user device 142, has been properly authenticated. In one implementation, the downloading of video content may occur using the file transfer protocol (FTP). In another implementation, the downloading of video content may occur using another type of protocol.

Policy management server 134 may include a server device, such as a computer device, that may provide real-time network policies associated with each home network, signal flow policies, security policies, quality of service thresholds, gateway router bandwidth allocations, etc. In one implementation, policy management server 134 may receive a request for a video streaming session to provide HD3D content to a user device 142 in home network 140. Policy management server 134 may evaluate, for example, network conditions and bandwidth requirements associated with the request, and may determine whether the video streaming session can be supported. If the video streaming session cannot be supported, policy management server 134 may deny the request. If the video streaming session can be supported, policy management server 134 may reserve the required bandwidth and notify content server 132.

Streaming device 136 may include a server device, such as a computer device, and/or a network device, such as a router, that provides streaming data packets to user device 142. Streaming device 136 may receive a request for streaming content from user device 142 and may continue to provide streaming content to user device 142 until particular requested content is received or user device 142 terminates a connection with streaming device 136.

Content cache 138 may include a server device, such as a computer device, and/or or a storage device, such as a database, that temporarily stores video content. For example, content cache 138 may store content, such as HD3D content, received from content storage system 120 and provide the stored content to streaming device 138 for delivery to user device 142.

Home network 140 may include one or more devices that transmit requests to data center 110 and/or content delivery system 130, and receive information from data center 110 and/or content delivery system 130. Home network 140 may include, for example, one or more user devices 142, personal computers, digital video recorders (DVR), and/or televisions. Home network 140 may also include other devices (not shown), such as additional media storage devices, a home router, a gateway (e.g., an optical network terminal (ONT)), etc. Home network 140 may connect to access network 150, content delivery system 130, and/or other networks (e.g., public network 160). In one implementation, devices in home network 140 may connect to content delivery system 130 (e.g., via access network 150) to receive managed services (e.g., such a multimedia content provided with a guaranteed quality of service (QoS)) via a closed content distribution channel. The closed content distribution channel may be implemented through a subscription multimedia service providing network access through, for example the gateway, home router, or a local set-top box. Thus, access to content delivery system 130 may be restricted to particular users, user devices 142, and/or application running on the user devices 142.

User device 142 may include any device capable of communicating via a network, such as home network 140 and/or access network 150, and decoding an HD3D signal. For example, user device 142 may include an HD3D-enabled device that may receive HD3D content via a network connection. Examples of user device 142 may include a 3D-capable Blu-ray™ disc player, a digital television receiver, a set-top box, a personal computer, a digital video recorder (DVR), or another device that may receive and present (e.g., to a user) content options and HD3D content. In one implementation, user device 142 may comply with the Multiview Video Coding (MVC) video compression standard promulgated by the Moving Picture Experts Group (MPEG). In another implementation, user device 142 may include digital rights management (DRM) functionality to retrieve security information (e.g., decryption keys) and decrypt protected content received from content delivery system 130.

In an example implementation, user device 142 may include a client-side application that enables user device 142 to communicate with, for example, data center 110 and/or present information received from data center 110 to user. The client-side application (or instructions to retrieve the client-side application) may be included in, for example, portable media (e.g., a Blu-ray disc, a flash drive, etc.) that a user may supply to user device 142. In one implementation, user device 142 may request, from data center 110 (e.g., via home network 140, access network 150, and public network 160) a list of content available for downloading. User device 142 may include an interactive client interface that allows a user to select (e.g., via a remote control) from the list of available content. In another implementation, user device 142 may request (e.g., via home network 140) the selected content from a remote server (e.g., content server 132 in content delivery system 130) via the closed content distribution channel.

Access network 150 may provide customers with multimedia content provided, for example, by content delivery system 130. Access network 150 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 150 may include a number of separate networks that function to provide services to home network 110. In one implementation, access network 150 may terminate at home network 110 via an optical communication link, such as an optical fiber provided to home network 110. In another possible implementation, access network 150 may terminate at home network 110 via a coaxial cable. In still another implementation, access network 150 may terminate at home network 110 via a wireless (e.g., satellite) connection.

Public network 160 may include a WAN, an intranet, a telephone network (e.g., the Public Switched Telephone Network), or a combination of networks. Public network 160 may include, for example, an untrusted network, such as the Internet. Public network 160 may further include transport and/or network devices such as routers, switches, and/or firewalls While FIG. 1 shows a particular number and arrangement of networks and/or devices, in practice, environment 100 may include additional networks/devices, fewer networks/devices, different networks/devices, or differently arranged networks/devices than are shown in FIG. 1. For example, each of devices 112-118 and 132-138 may be implemented as multiple, possibly distributed, devices. Alternatively, two or more of devices 112-118 and 132-138 may be implemented within a single device.

Figure 2:
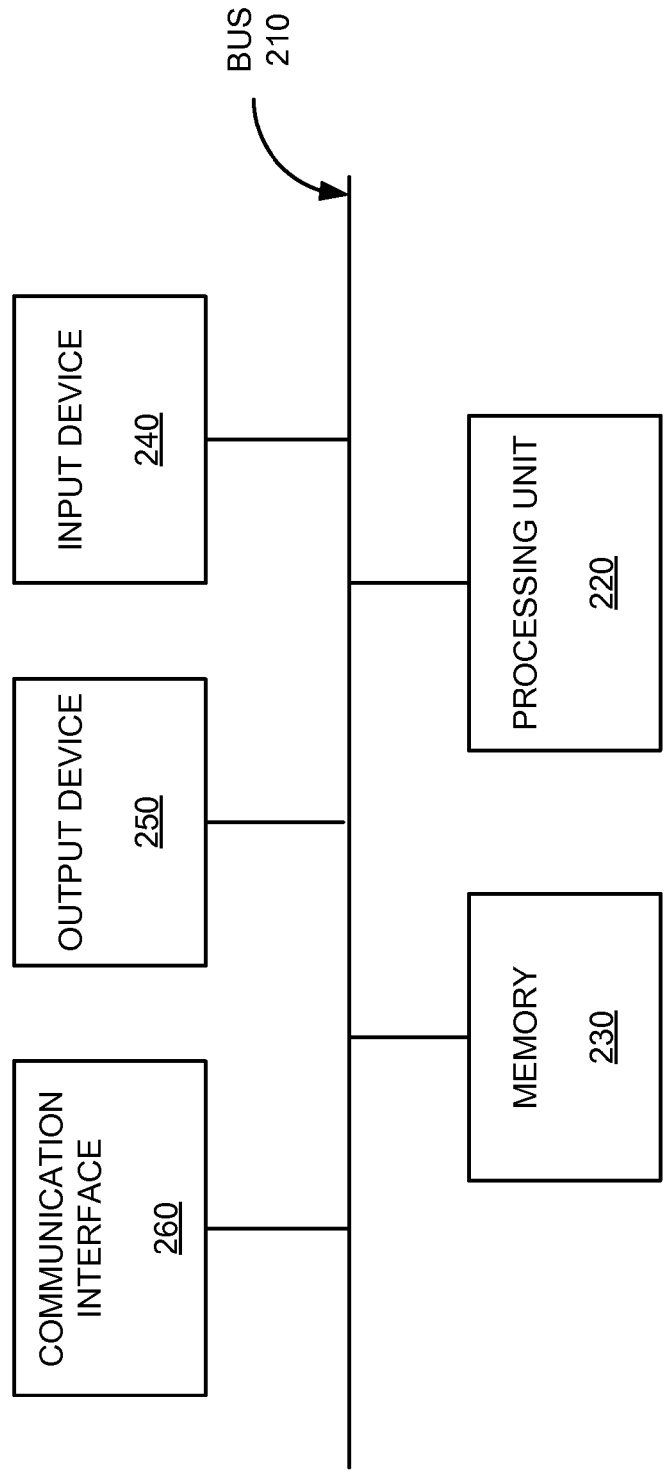
FIG. 2 is a diagram of example components of a device that may be used within the environment of FIG. 1.

FIG. 2 is a diagram of example components of a device 200. Device 200 may correspond to application server 112, profile server 114, license server 116, catalog server 118, content storage system 120, content server 132, policy management server 134, streaming device 136, or user device 142. Each of application server 112, profile server 114, license server 116, catalog server 118, content storage system 120, content server 132, policy management server 134, streaming device 136, and user device 142 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
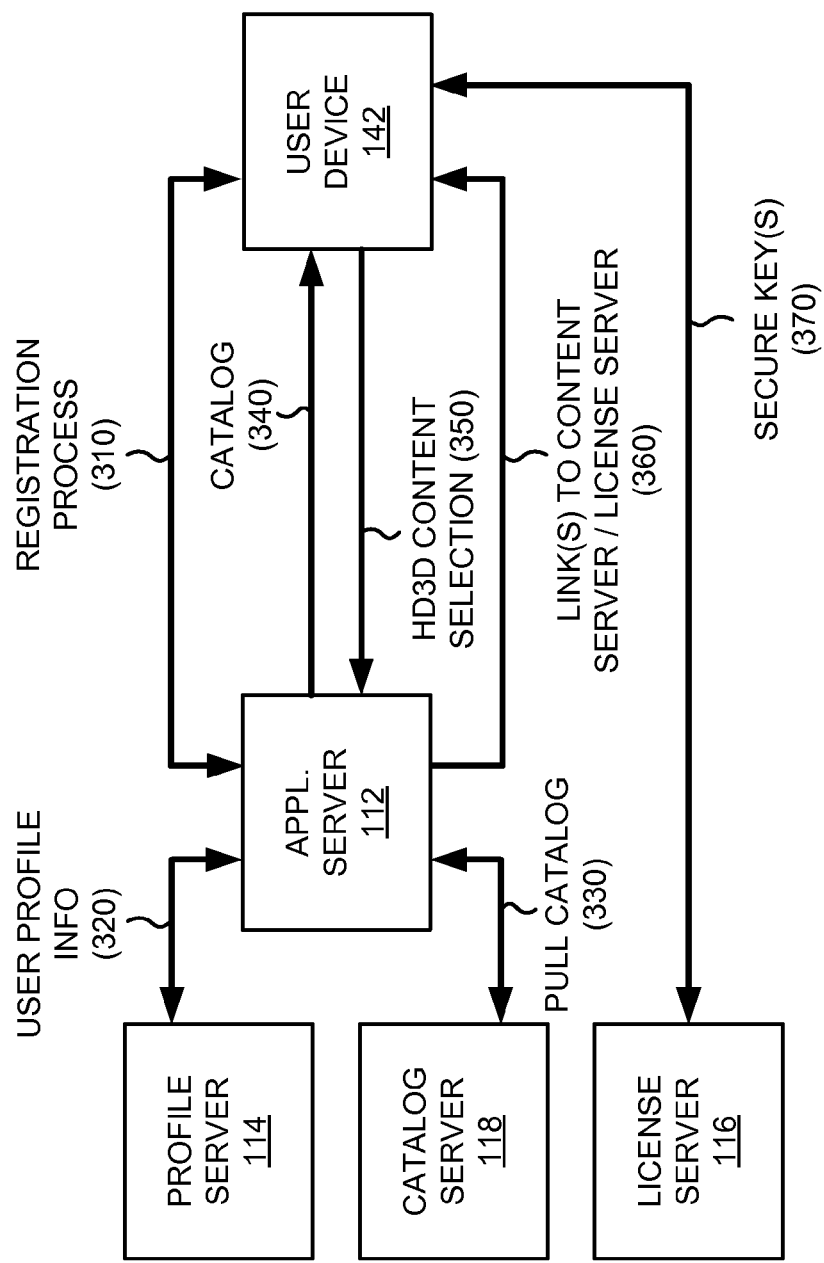
FIG. 3 is a diagram of example interactions between components of an example portion of the network depicted in FIG. 1.

FIG. 3 depicts a diagram of example interactions among components of an example portion 300 of network 100. As illustrated, example network portion 300 may include application server 112, profile server 114, license server 116, catalog server 118, and user device 142. Application server 112, profile server 114, license server 116, catalog server 118, and user device 142 may include the features described above in connection with one or more of FIGS. 1 and 2.

As further shown in FIG. 3, a user (not shown) may utilize user device 142 to initiate a connection with application server 112 (e.g., via access network 150 and public network 160) and initiate a registration process 310. In one implementation, registration process 310 may be conducted as a sequence of HTTP and/or HTTPS requests and responses. Registration process 310 may include, for example, a login sequence that includes submission, by user device 142 to application server 112, of a user name and/or password (e.g., which may be input by a user of user device 142 via, for example, a television/remote control interface). Application server 112 may retrieve user profile information, associated with the user, from profile server 114, as indicated by reference number 320. Application server 112 may, for example, compare the password received user device 142 with a password stored in the user profile to authenticate the user (e.g., of user device 142). Application server 112 may also identify a level of subscription services and/or access rights associated with the user profile. Additionally, or alternatively, application server 112 may provide updates to user profile information 320 based on inputs received from user device 142.

Assuming a user is authenticated, application server 112 may initiate a request for and receive a catalog 340 from catalog server 118, as indicated by reference number 330. Catalog 340 may include video content metadata, such as lists or categories of video content. In one implementation, catalog 340 may include information for a variety of content (e.g., video on demand (VOD) content, HD VOD content, HD3D VOD content, TV programming, movies, on-demand services, live television, remote DVR content, etc.) that may be stored in remote locations, such as content storage system 120, other home networks 110, or another network or other devices. Catalog 340 may also include content that is available in a variety of formats, such as HD, 3DHD, etc. In one implementation, application server 112 may receive catalog information from catalog server 118 and format the catalog information into a format appropriate for user device 142. Application server 112 may send catalog 340 to user device 142. In another implementation, catalog 340 may include a link (e.g., a URL) to another device where user device 142 can access catalog 340.

User device 142 may receive catalog 340 and may present catalog 340 to a user of user device 142. The user may select (e.g., via a remote control) particular content from catalog 340 to view. The indication of the particular content selection may be sent from user device 142 to application server 112 as an HD3D content selection 350. HD3D content selection 350 may include selection of a HD3D TV program from catalog 340. Application server 112 may receive HD3D content selection 350 and may provide (e.g., using an HTTP/HTTPS connection via access network 150 and public network 160) to user device 142 a link (e.g., a URL) to content server 132 and/or a link to license server 116, as indicated by reference number 360. The link to content server 132 may include, for example, a URL to access content server 132 within content delivery system 130. The link to license server 116 may include, for example, an IP address to access license server 116. User device 142 may receive links 360.

As shown in FIG. 3, in response to link 360 to license server 116, user device 142 may initiate a connection to obtain one or more secure key(s) 370, such as a decryption key that permits user device 142 to decrypt the selected video content. In another implementation, license server 116 may be included within another component of data center 110 or content delivery system 130. User device 142 may use link 360 to content server 132 to retrieve the HD3D content selected by the user, as described further with respect to FIG. 4.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
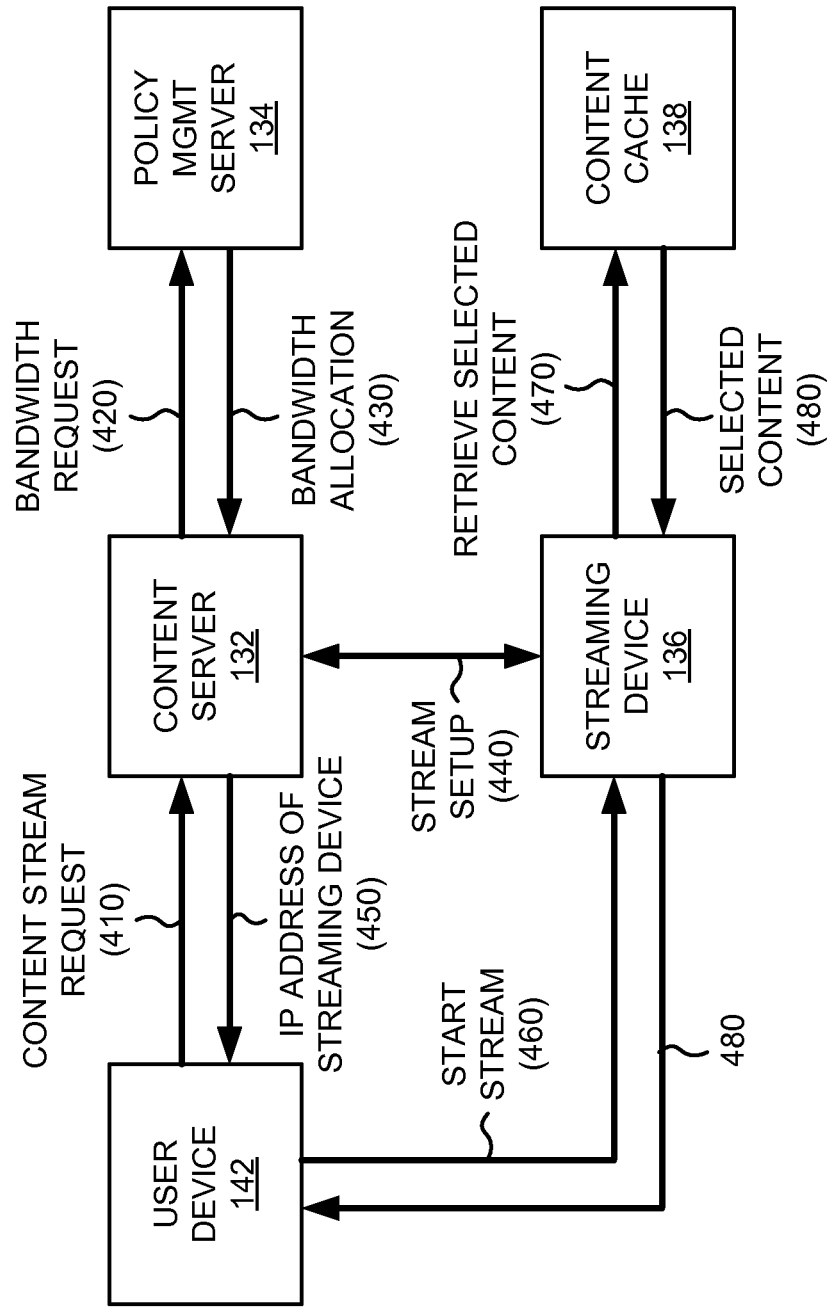
FIG. 4 is a diagram of example interactions between components of another example portion of the network depicted in FIG. 1.

FIG. 4 depicts a diagram of example interactions among components of another example portion 400 of network 100. As illustrated, example network portion 400 may include content server 132, policy management server 134, streaming device 136, content cache 138, and user device. Content server 132, policy management server 134, streaming device 136, content cache 138, and user device 142 may include the features described above in connection with one or more of FIGS. 1-3.

As shown in FIG. 4, based on link 360 to content server 132 that was received from application server 112, user device 142 may send a content stream request 410 to content server 132. Content server 132 may receive content stream request 410 and may submit a bandwidth request 420 to policy management server 134 to reserve resources (e.g., a network connection between content delivery system 130 and home network 110) to support bandwidth requirements for the HD3D content requested by user device 142. For example, policy management server 134 may review current obligations and available bandwidth on a particular gateway router (not shown) that may service home network 110. Assuming network resources are available, policy management server 134 may respond to content server 132 with a bandwidth allocation message 430.

In response to bandwidth allocation message 430, content server 132 may communicate with streaming device 136 to set up a streaming session to send the selected HD3D content to user device 142, as indicated by reference number 440. Based on stream setup communications 440, content server 132 may send, to user device 142, an IP address 450 of streaming device 136 (e.g., that will provide the selected content to user device 142). User device 142 may use IP address 450 to submit a start stream message 460 to streaming device 136. In response to the start stream message 460, streaming device 136 may retrieve selected content from, for example, content cache 138 (or alternatively, from content storage system 120), as indicated by reference number 470.

Streaming device 136 may receive selected content 480 from content cache 138, and may provide selected content 480 to user device 142. In one implementation, streaming device 136 may stream selected content 480 using packets and/or chunks and may designate packets for a particular QoS treatment. Thus, in implementations described herein, full-resolution HD3D content streaming is achieved via a managed content delivery network (e.g., from content delivery system 130 to access network 150) with QoS control while a user's content selection, purchase, and browsing activities are conducted via a broadband/or Internet connection (e.g., from data center 110 to access network 150 via public network 160).

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

Figure 5:
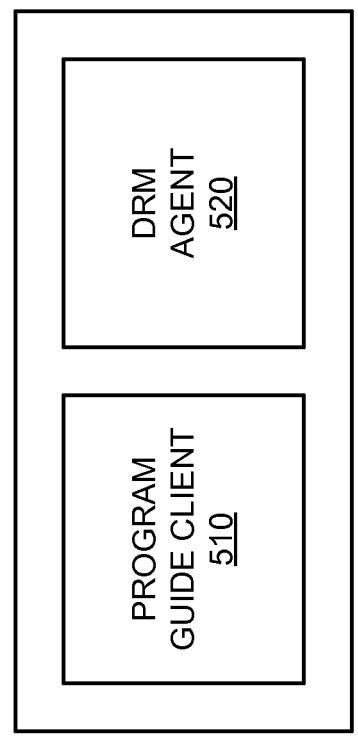
FIG. 5 is a diagram of example functional components of the user device of FIG. 1.

FIG. 5 is a diagram of example functional components of user device 142. In one implementation, the functions described in connection with FIG. 5 may be performed by one or more components of device 200 (FIG. 2). As shown in FIG. 5, user device 142 may include a program guide client 510 and a DRM agent 520.

Program guide client 510 may include hardware or a combination of hardware and software that may enable user device 142 to interface with data center 110 and content delivery system 130 and to present content selection options to a user. In one implementation, program guide client 510 may be stored temporarily (e.g., in memory 230) on user device 142. For example, in one implementation, where user device 142 is a Blue-ray disc player, portable media (e.g., a Blu-ray disc) including an IP address for application server 112 may be inserted, by a user, into the Blue-ray disc player. The disc may include instructions to cause the Blue-ray disc player to connect to application server 112 using the IP address. For example, program guide client 510 may be downloaded to user device 142 by application server 112 as part of registration process 310 (e.g., described above in connection with FIG. 3). In one implementation, program guide client 510 may request, from data center 110, a list of content available for downloading and may present the list of content to a user (e.g., via presentation on a television display). Program guide client 510 may include an interactive client interface that allows a user provide inputs (e.g., via a remote control) such as user passwords, preferences, and selections from the list of available content.

DRM agent 520 may include hardware or a combination of hardware and software that may retrieve security information (e.g., decryption keys) from license server 116 (or another device) to access protected content received from content delivery system 130. For example, DRM agent 520 may communicate with program guide client 510 to identify selected content (e.g., HD3D content) and coordinate the receipt of DRM security information (e.g., from license server 116) with the protected content from content delivery system 130. Protected content may include, for example, any content encrypted to enforce copyright restrictions.

Although FIG. 5 shows example functional components of user device 142, in other implementations, user device 142 may include fewer functional components, different functional components, differently arranged functional components, and/or additional functional components than depicted in FIG. 5. Alternatively, or additionally, one or more functional components of user device 142 may perform one or more other tasks described as being performed by one or more other functional components of user device 142.

Figure 6:
FIG. 6 is a flowchart of an example process for providing high-definition stereoscopic video content to a user device, according to an implementation described herein.

FIG. 6 is a flowchart of an example process 600 for providing HD3D video content to user device 142. In one implementation, process 600 may be performed by one or more components of application server 112 and/or content server 132, such as one or more processing units 220. In another implementation, one or more blocks of process 600 may be performed by one or more components of other devices (e.g., one or more of application server 112, profile server 114, license server 116, catalog server 118, content storage system 120, content server 132, policy management server 134, streaming device 136 and user device 142), or a group of devices including or excluding application server 112 and/or content server 132.

Process 600 may include conducting a login sequence with a user device (block 610), and providing, to the user device, a catalog including HD3D content options (block 620). For example, as described above in connection with FIG. 3, a user may utilize user device 142 to initiate a connection with application server 112 (e.g., via access network 150 and public network 160) and initiate registration process 310. Registration process 310 may include, for example, a login sequence that includes submission, by user device 142 to application server 112, of a user name and/or password (e.g., which may be input by a user of user device 142 via, for example, a television/remote control interface). Assuming a user is authenticated, application server 112 may initiate a request for and receive catalog 340 from catalog server 118, as indicated by reference number 330. Catalog 340 may include video content metadata, such as lists or categories of video content. Catalog 340 may include content that is available in a variety of formats, such as HD, 3DHD, etc. Application server 112 may send catalog 340 to user device 142. In another implementation, catalog 340 may include a link (e.g., a URL) to another device where user device 142 can access catalog 340.

A request for particular HD3D content may be received from the user device (block 630), and a link to a content server may be sent to the user device (block 640). For example, a described above in connection with FIG. 3, user device 142 may receive catalog 340 and may present catalog 340 to a user of user device 142. The user may select (e.g., via a remote control) particular content from catalog 340 to view. The indication of the particular content selection may be sent from user device 142 to application server 112 as HD3D content selection 350. HD3D content selection 350 may include selection of a HD3D TV program from catalog 340. Application server 112 may receive HD3D content selection 350 and may provide (e.g., using an HTTP/HTTPS connection via access network 150 and public network 160) to user device 142 a link (e.g., a URL) to content server 132, as indicated by reference number 360. Link 360 to content server 132 may include, for example, a URL to access content server 132 within content delivery system 130.

A video streaming request may be received from the user device via the link (block 650), and approval/allocation of required bandwidth for the particular HD3D content may be requested (block 660). For example, as described above in connection with FIG. 4, user device 142 may send content stream request 410 to content server 132. Content server 132 may receive content stream request 410 and may submit bandwidth request 420 to policy management server 134 to reserve resources (e.g., a network connection between content delivery system 130 and home network 110) to support bandwidth requirements for the HD3D content requested by user device 142. Assuming network resources are available, policy management server 134 may respond to content server 132 with bandwidth allocation message 430.

A streaming IP address for the particular HD3D content may be sent to the user device (block 670), a request for particular HD3D content may be received from the user device via the streaming IP address (block 680), and a media streaming session may be conducted with the user device for the particular HD3D content (block 690). For example, as described above in connection with FIG. 4, content server 132 may send, to user device 142, IP address 450 of streaming device 136 (e.g., that will provide the selected content to user device 142). User device 142 may use IP address 450 to submit start stream message 460 to streaming device 136. In response to start stream message 460, streaming device 136 may retrieve selected content from, for example, content cache 138 (or alternatively, from content storage system 120), as indicated by reference number 470. Streaming device 136 may receive selected content 480 and may provide selected content 480 to user device 142.

Systems and/or methods described herein may receive, from a user device via a public network connection, a selection of HD3D content and may send, to the user device, a link to a content delivery system that will provide the selected HD3D content. The system and/or methods also may receive, from the user device, a streaming request for the selected HD3D content and may reserve bandwidth, for the selected HD3D content, within a managed network. The systems and/or methods may also send, to the user device, a streaming IP address for providing the selected HD3D content over the managed network. Use of the systems and/or methods described herein may achieve full-resolution HD3D content streaming via a managed content delivery network with QoS control while a user's content selection, purchase, and browsing activities are conducted via a broadband/or Internet connection.

The foregoing description provides illustration and description, but is not intended to be exhaustive or to limit the invention to the precise form disclosed. Modifications and variations are possible in light of the above teachings or may be acquired from practice of the invention. For example, while high bandwidth content has been described in the context of HD3D content, in other implementations, other high-bandwidth content may be provided using the systems and methods described herein. Also, while a series of blocks has been described with regard to FIG. 6, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a data center and from a user device via a public network connection, a selection of high-definition three-dimensional (HD3D) content;
    authenticating, by the data center and based on the receiving the selection of HD3D content, the user device to receive services via a managed network,
    sending, by the data center and to the authenticated user device via the public network connection, a link to a content delivery system, within the managed network, to provide the selected HD3D content, wherein the sending the link to a content delivery system is in response to the receiving the selection of the HD3D content;
    sending, by the data center and to the authenticated user device via the public network connection, a link to a license server, wherein sending the link to the license server is in response to the receiving the selection of the HD3D content;
    sending, by the license server and to the authenticated user device, in response to a connection initiated via the sent link to the license server, a license that includes a decryption key for the selected HD3D content and information regarding a type of use of content permitted by the authenticated user device;
    receiving, by the content delivery system within the managed network and from the user device, a streaming request for the selected HD3D content;
    reserving, by the content delivery system when the streaming request is a streaming request for the type of use of content permitted by the authenticated user device, bandwidth to deliver the selected HD3D content over the managed network; and
    sending, by the content delivery system and to the user device, a streaming Internet protocol (IP) address for providing the selected HD3D content over the managed network.

2. The method of claim 1, further comprising:
    receiving, from the user device and via the streaming IP address, a request for the selected HD3D content; and
    streaming, to the user device, the selected HD3D content over the managed network.

3. The method of claim 2, where streaming the selected HD3D content includes streaming the selected content in a Multiview Video Coding (MVC) standard.

4. The method of claim 1, further comprising:
    receiving, from the user device via the public network connection, a request for a catalog of content available to a user of the user device; and sending, to the user device, the catalog, where the catalog includes one or more titles of HD3D content and other content available for selection by the user.

5. The method of claim 1, further comprising:
setting up a streaming session, with a streaming device, to send the selected HD3D content to the user device.

6. The method of claim 1, where the selected HD3D content includes stereoscopic video with 1080p resolution with scanning at 60 frames per second.

7. The method of claim 1, where reserving bandwidth for the selected HD3D content includes reserving more than 15 megabits per second (Mbps).

8. The method of claim 2, where streaming the selected HD3D content includes streaming packets, including the selected HD3D content, with guaranteed quality of service (QoS).

9. The method of claim 1, wherein authenticating the user device to receive services via a managed network includes:
authenticating a user or an application residing on the user device.

10. The method of claim 9, where authenticating the user, the user device, or the application includes at least one of:
receiving login information associated with the user, and comparing the login information with stored information to authenticate the user,
receiving device information associated with the user device, and comparing the device information with stored information to authenticate the user device, or
receiving application information associated with the application, and comparing the application information with stored information to authenticate the application.

11. The method of claim 4, wherein the user device is one of:
a Blu-ray disc player; a digital television receiver; or a digital video recorder (DVR), and wherein the user device provides the request for the catalog of content based on an IP address read from portable media.

12. A device, comprising:
a memory to store a plurality of instructions; and
a processor to execute instructions in the memory to:
receive, from a user device via a public network connection, a request for a catalog of content available to a user of the user device;
send the catalog to the user device, where the catalog includes one or more titles of high-definition three-dimensional (HD3D) content available for selection by the user;
receive, from the user device via the public network connection, a particular selection of HD3D content;
authenticate, based on receiving the selection of HD3D content, the user device to receive services via a managed network,
send, to the authenticated user device via the public network connection, a link to a content delivery server to provide the selected HD3D content, wherein the content delivery server is connected to the user device via a managed network connection, and wherein sending the link to a content delivery server is in response to the receiving the particular selection of the HD3D content;
send, to the authenticated user device via the public network connection, a link to a license server, wherein sending the link to the license server is in response to the receiving the selection of the HD3D content; and
send to the authenticated user device and in response to a connection initiated via the sent link to the license server, a license that includes a decryption key for the selected HD3D content and information regarding a type of use of content permitted by the authenticated user device.

13. The device of claim 12, where the selected HD3D content is encrypted video content.

14. The device of claim 12, where the processor is further to:
send, to the user device, an application that enables the user device to present, to a user, information received from a data server in an interactive format.

15. One or more devices, comprising:
a memory to store a plurality of instructions; and
one or more processors to execute instructions in the memory to:
send, to a data server and via a public network connection, a catalog of content items available to users and a universal resource locator (URL) for a user device to retrieve a selected content item;
receive, from the user device and via the URL using the public network connection, a streaming request for a selected high-definition three-dimensional (HD3D) content item;
reserve bandwidth to provide the selected HD3D content item, via a managed network connection, to the user device;
send, to the user device via the public network connection, a streaming Internet protocol (IP) address for providing the selected HD3D content item over the managed network connection, wherein the sending the streaming IP address is based on reserving the bandwidth to provide the selected HD3D content;
send, to the user device via the public network connection, a link to a license server, wherein sending the link to the license server is based on reserving the bandwidth to provide the selected HD3D content;
send to the user device and in response to a connection initiated via the sent link to the license server, a license that includes a decryption key for the selected HD3D content and information regarding a type of use of content permitted by the user device;
receive, from the user device and via the streaming IP address, a request for the selected HD3D content item; and
stream, to the user device, the selected HD3D content item via the managed network connection when the request is a request for a type of use of content permitted by the user device.

16. The device of claim 15, where the one or more processors are further to:
set up a streaming session, with a streaming device, to send the selected HD3D content item to the user device.

17. The device of claim 15, where the one or more processors are further to:
designate the selected HD3D content item with guaranteed quality of service (QoS).

18. The device of claim 15, where the selected HD3D content item includes stereoscopic video with 1080p resolution with scanning at 60 frames per second.

* * * * *